United States Patent [19]
Noro et al.

[11] Patent Number: 5,809,438
[45] Date of Patent: Sep. 15, 1998

[54] ELECTRIC POWER STEERING APPARATUS

[75] Inventors: Yoshiki Noro; Shinzi Hironaka; Yoshinobu Mukai; Nobuo Sugitani; Takao Kurosawa, all of Wako, Japan

[73] Assignee: Honda Giken Kogyo Kabushiki Kaisha, Tokyo, Japan

[21] Appl. No.: 672,122

[22] Filed: Jun. 27, 1996

[30] Foreign Application Priority Data

Jul. 17, 1995 [JP] Japan ................................ 7-180422

[51] Int. Cl.$^6$ .............................. G06G 7/70; B62D 5/04
[52] U.S. Cl. ............................... 701/41; 701/42; 701/43; 180/422; 180/446; 318/430; 318/432
[58] Field of Search ................................ 701/41, 42, 43, 701/44, 36, 1; 180/412, 422, 446; 318/138, 139, 430, 432, 439, 599, 254, 811; 363/41, 98

[56] References Cited

U.S. PATENT DOCUMENTS

| | | | |
|---|---|---|---|
| 4,988,939 | 1/1991 | Reichard et al. | 318/800 |
| 5,015,927 | 5/1991 | Reichard | 318/139 |
| 5,079,494 | 1/1992 | Reichard | 318/811 |
| 5,256,076 | 10/1993 | Reichard et al. | 318/254 |
| 5,404,960 | 4/1995 | Wada et al. | 701/41 |
| 5,444,622 | 8/1995 | Takeshima et al. | 701/41 |
| 5,473,539 | 12/1995 | Shimizu et al. | 701/41 |
| 5,569,991 | 10/1996 | Matsuoka et al. | 318/286 |
| 5,596,252 | 1/1997 | Shimizu et al. | 318/432 |
| 5,612,877 | 3/1997 | Shimizu et al. | 701/41 |
| 5,631,529 | 5/1997 | Shimizu et al. | 318/432 |
| 5,675,699 | 10/1997 | Yamamoto et al. | 318/138 |

Primary Examiner—Jacques H. Louis-Jacques
Attorney, Agent, or Firm—Merchant, Gould, Smith, Edell, Welter & Schmidt, P.A.

[57] ABSTRACT

In a controller of an electric power steering apparatus for use with an automotive vehicle, a regenerating condition determining section determines whether or not a motor of the vehicle is in a regenerating condition, and a regeneration control signal generating section generates a regeneration control signal to control the regenerating condition of the motor. A switching section selects between the motor control signal and the regeneration control signal in accordance with a result of determination by the regenerating condition determining section. With this arrangement, a motor current including a regenerative current that is caused to flow in the motor in response to a vehicle driver effecting during-stoppage steering maneuvering and then releasing a steering wheel can be controlled independently of a feedback loop of the controller. The regeneration control signal generating section generates a pulse-width-modulated signal of duty cycle corresponding to the offset between a target current and a motor current flowing in the motor. The regenerating condition determining section determines that the motor is in the regenerating condition if the signs of the target current and motor current control signals do not comport with each other and the direction of the steering torque signal and the rotational direction of the motor are opposite to each other.

3 Claims, 8 Drawing Sheets

ELECTRIC POWER STEERING APPARATUS

BACKGROUND OF THE INVENTION

1. Field of the Invention

The present invention relates to electric power steering apparatuses for use with automotive vehicles, which provide a steering assist of an electric motor directly to the vehicle steering system to substantially reduce steering power to be applied manually by a vehicle driver.

2. Description of the Related Art

Feedback-type electric power steering apparatuses for use with automotive vehicles have conventionally been known, in which typically a control unit sets a target current signal on the basis of steering torque detected via a steering torque sensor and generates a motor control signal corresponding to the target current signal. The thus-generated motor control signal is sent to a motor drive unit including a bridge circuit of a plurality of switching elements, so as to drive the drive unit to generate a pulse-width-modulated motor voltage (PWM voltage) for driving the vehicle's electric motor. An electric current thus caused to flow in the motor (hereinafter "motor current") is detected and negatively fed back to be subtracted from the target current signal, in such a manner that the motor voltage is controlled in accordance with an offset between the target current signal and the motor current. Thus, a steering assist corresponding to the driver's steering force can be applied to the vehicle steering system via the electric motor that is driven with the motor current equivalent to the target current.

In such known feedback-type electric power steering apparatuses, power transistors such as power FET's (Field-Effect Transistors) are employed as the switching elements of the bridge circuit in the motor drive unit, and through such a bridge circuit, the motor drive unit controls the duty cycle of the pulsed motor voltage that is to be supplied to the motor after pulse width modulation. In this manner, the electric motor is driven appropriately by a motor current corresponding to the steering torque.

Figure 6:
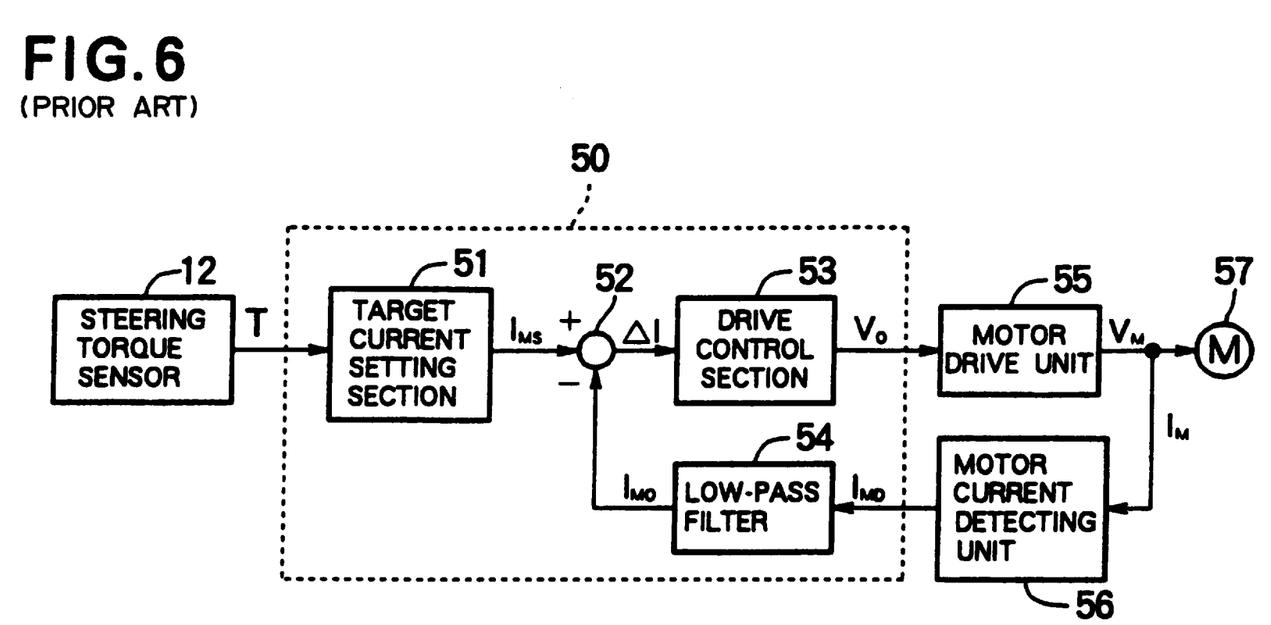
FIG. 6 is a block diagram showing principal components of a typical known electric power steering apparatus.

FIG. 6 is a block diagram showing principal components of a steering control in a typical known electric power steering apparatus of the above-mentioned type, which comprises a steering torque sensor 12, a control unit 50 including a target current setting section 51, an offset determining section 52, a drive control section 53 and a low-pass filter 54, a motor drive unit 55, a motor current detecting unit 56, and an electric motor 57.

When a vehicle driver operates the steering wheel, the steering torque sensor 12 outputs a steering torque signal T corresponding to the intensity and direction (clockwise or counterclockwise) of the steering torque produced by the steering operation. Then, in the control unit 50, the target current setting section 51 generates a target current signal $I_{MS}$ corresponding to the steering torque signal T, which is supplied to the offset determining section 52. For example, the driver's steering operation in the clockwise direction will produce a target current signal $I_{MS}$ of positive (+) polarity, while the driver's steering operation in the counterclockwise direction will produce a target current signal $I_{MS}$ of negative (−) polarity.

A motor current signal $I_{MD}$ detected by the motor current detecting unit 56 (motor current detection signal $I_{MD}$) is sent to the low-pass filter 54 that attenuates high-frequency components of the signal $I_{MD}$, so that the attenuated signal $I_{MD}$ is fed back to the minus ("−") input of the offset determining section 52 as a current signal $I_{MO}$, corresponding to a motor current $I_M$ generated by the motor drive unit 55. When a normal clockwise or counterclockwise steering operation is performed, the target current signal $I_{MS}$, and the motor current $I_M$ are set to be identical in polarity.

The offset determining section 52 of the control unit 50 calculates an offset between the target current signal $I_{MS}$, and current signal $I_{MO}$, and an offset signal indicative of the offset $\Delta I(=I_{MS}-I_{MO})$ is supplied to the drive control section 53. The drive control section 53 applies PID (proportional and integral and derivative) compensation operations to the offset signal $\Delta I$ so as to generate a motor control signal $V_O$, that is a composite or combination of a PWM (pulse-width-modulated) signal and ON/OFF signals, and the motor drive unit 55 is controlled on the basis of the PWM signal to provide a PWM-controlled motor voltage $V_M$. In response to the motor voltage $V_M$, the motor 57 is driven in such a manner that the motor current $I_M$ equals the target current signal $I_{MS}$.

Figure 7:
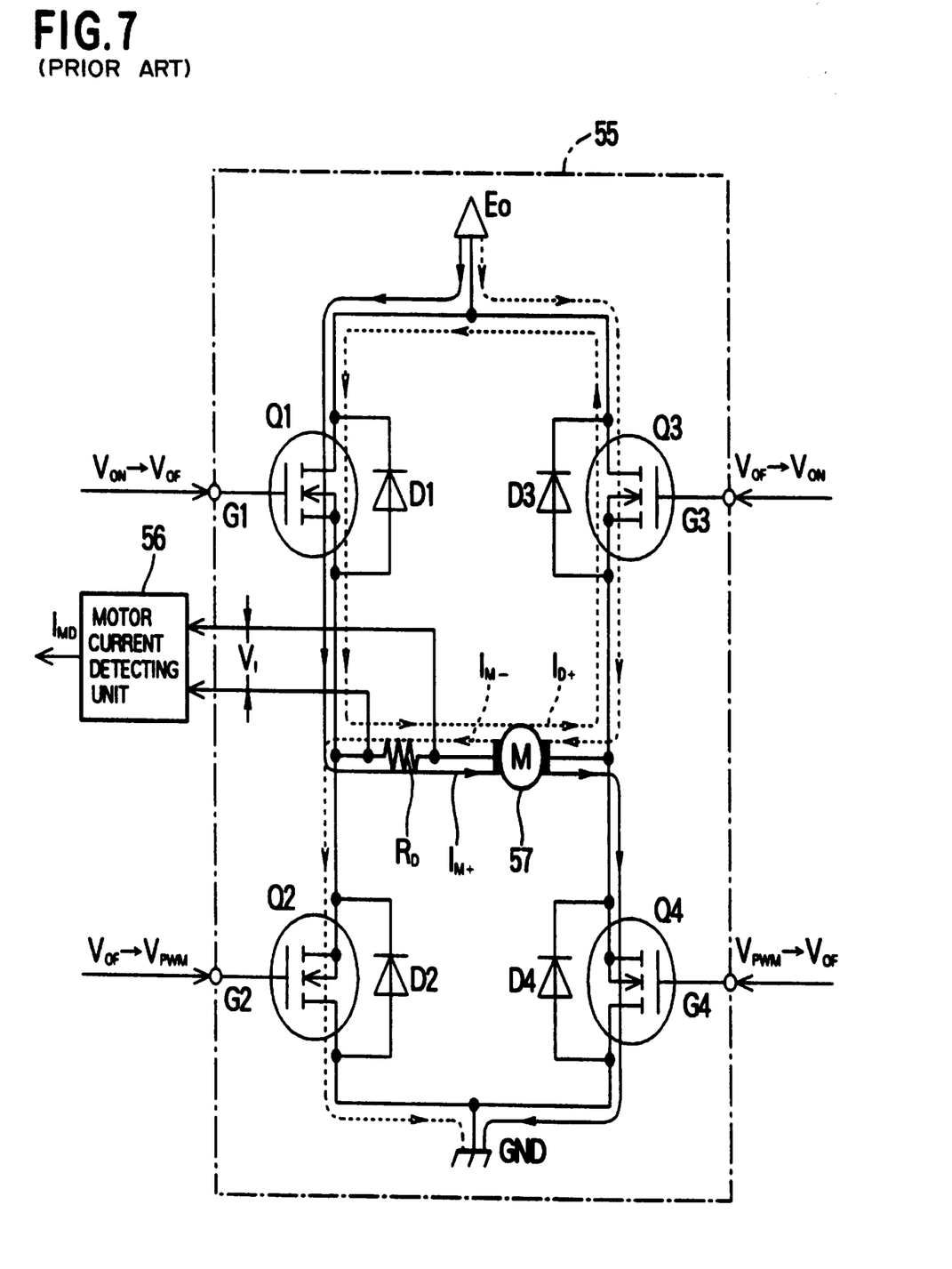
FIG. 7 is a diagram explanatory of the operation of the prior known electric power steering apparatus of FIG. 6.

FIG. 7 is a diagram explanatory of the operation of the motor drive unit of FIG. 6. In FIG. 7, the motor drive unit 55 includes four power FET's (Field-Effect Transistors) Q1 to Q4 forming a bridge circuit and having equivalent diodes D1 to D4 connected between their respective sources and drains. The transistors Q1 and Q3 are connected to a D.C. power supply $E_O$, while the transistors Q2 and Q4 are connected to a vehicle body ground GND.

Between the contacts of the transistors Q1 and Q2 and of the transistors Q3 and Q4, there are connected in series a motor current detecting resistor $R_D$ and the electric motor 57. The motor voltage $V_M$, and motor current $I_M$, are supplied to the motor 57 by controlling the respective gates G1 to G4 of the transistors Q1 to Q4 with the composite motor control signal $V_O$ ($V_{ON}$, $V_{PWM}$, $V_{OF}$) sent from the drive control section 53 of FIG. 6.

When the vehicle driver operates the steering wheel in the clockwise direction while the vehicle is stopped (i.e., the driver effects "during-stoppage steering operation" in the clockwise direction), the drive control section 53 supplies the ON signal $V_{ON}$ to the gate G1, the PWM signal $V_{PWM}$ to the gate G4 and the OFF signal $V_{OF}$ to the gates G2 and G3, for example. Thus, the motor current $I_{M+}$ is directed from the D.C. power supply $E_O$ through the transistor Q1, resistor $R_D$, electric motor 57, transistor Q4, to the ground GND as denoted by solid-line arrows, so that the motor 57 is caused to rotate in a forward direction to apply a clockwise steering assist to the steering system.

If the vehicle driver then operates the steering wheel (effects "during-stoppage steering operation") in the counterclockwise direction past a neutral steering position, the drive control section 53 supplies the OFF signal $V_{OF}$ to the gates G1 and G4, the PWM signal $V_{PWM}$ to the gate G2 and the ON signal $V_{ON}$ to the gate G3. Thus, the motor current $I_{M-}$ is flown from the D.C. power supply $E_O$, through the transistor Q3, electric motor 57, resistor $R_D$, transistor Q2, to the ground GND as denoted by broken-line arrows, so that the motor 57 is caused to rotate in a reverse direction to apply a counterclockwise steering assist to the steering system.

By thus using the ON signal $V_{ON}$, OFF signal $V_{OF}$ and PWM signal $V_{PWM}$ of the composite motor control voltage $V_O$ to control the transistors Q1, Q4 and Q3, Q2 forming the opposite sides of the bridge circuit, the intensity and direction of the motor current $I_M$ ($I_{M+}$ or $I_{M-}$) are determined which control the rotational direction and torque of the motor 57.

With the conventional electric power steering apparatus, however, if the vehicle driver effects "during-stoppage steering operation" (e.g., in the clockwise direction) and then release the steering, the motor 57 may be caused to rotate by a considerable amount via springy components of the steering system such as rubber tires, so that the motor 57 produces counterelectromotive force $V_{MN}$ which would cause a "regenerative current" $I_{D+}$ to flow in the closed loop from the motor 57, through the diode D3, transistor Q1 and resistor $R_D$, back to the motor 57. In this case, a sum of the motor current $I_{M+}$ and regenerative current $I_{D+}$ ($I_{M+}+I_{D+}$) is detected via the motor current detecting resistor $R_D$, and a current signal $I_{MO}$ corresponding to the sum ($I_{M+}+I_{D+}$) is supplied via the low-pass filter 54 of FIG. 6 to the offset determining section 52.

Because the offset signal ΔI generated by the offset determining section 52 represents a difference between the target current signal $I_{MS}$ and current signal $I_{MO}$ (=$I_{M+}+I_{D+}$) of the same (positive) polarity, the offset signal ΔI will change from the positive (+) polarity to the negative (−) polarity once the regenerative current $I_{MO+}$ becomes large in intensity such that the current signal $I_{MO}$ (=$I_{M+}+I_{D+}$) exceeds the target current signal $I_{MS}$.

With the positive-to-negative polarity change of the offset signal ΔI, the motor control signal $V_O$ generated by the drive control section 53 as a result of PID-compensation of the offset signal ΔI is also caused to change with a little time delay. In response to this, the ON signal $V_{ON}$ is changed to the OFF signal $V_{OF}$ in the gate G1 of the transistor Q1, the OFF signal $V_{OF}$ is changed to the PWM signal $V_{PWM}$ in the gate G2 of the transistor Q2, the OFF signal $V_{OF}$ is changed to the ON signal $V_N$ in the gate G3 of the transistor Q3 and the PWM signal VPWM is changed to the OFF signal VOF in the gate G4 of the transistor Q4, and as a result, the motor current $I_{M-}$ is directed from the D.C. power supply $E_O$, through the transistor Q3, electric motor 57, resistor $R_D$ and transistor Q2, to the ground GND to thereby cause the motor 57 to rotate in the reverse direction.

Figure 8:
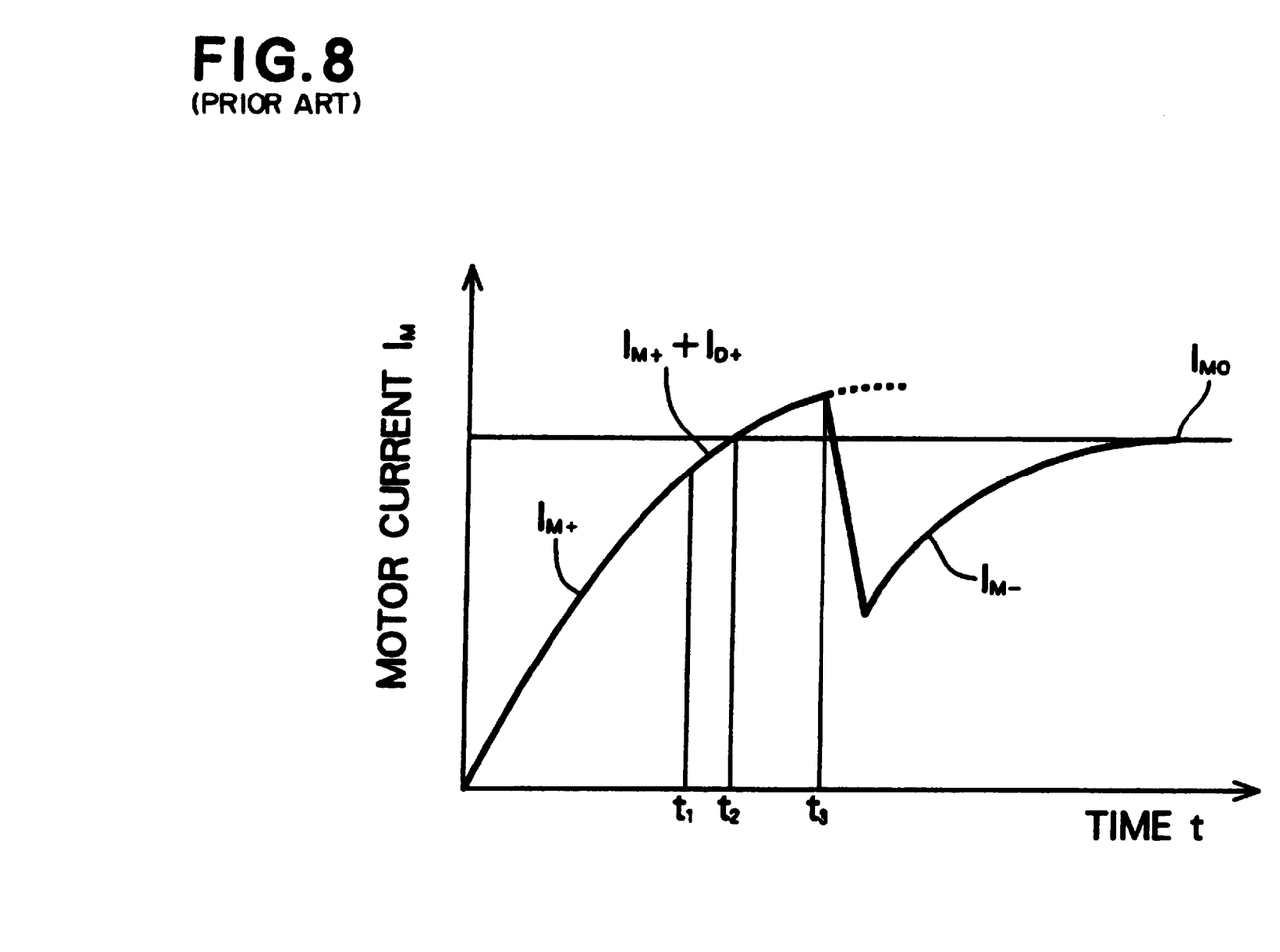
FIG. 8 is a graph showing time-varying characteristics of a motor current presented, in the known electric power steering apparatus of FIG. 6, when the vehicle driver effects during-stoppage steering maneuvering and then releases the steering wheel.

FIG. 8 shows time-varying characteristics presented, in the above-discussed conventional apparatus, when the vehicle driver effects during-stoppage steering maneuvering in the clockwise direction till time $t_1$ and then releases the steering wheel at time $t_1$. Thus, in FIG. 8, the motor current $I_{M+}$ up to time $t_1$ corresponds to the during-stoppage steering maneuvering. Once the steering wheel is released at time $t_1$, regenerative current $I_{D+}$ is added to the motor current $I_{M+}$ resulting in an increased sum of the motor current $I_{M+}$ and regenerative current $I_{D+}$ (=$I_{M+}+I_{D+}$) Then, via an integrating component of the drive control section 53, the sum signal ($I_{M+}+I_{D+}$) exceeds target current signal $I_{MS}$ at time $t_2$, and then the signal ($I_{M+}+I_{D+}$) is abruptly changed to a negative motor current $I_{M-}$ by being inverted to the negative polarity at time $t_3$ when the motor control signal $V_O$, inverts its polarity. Similar motor current characteristics are presented when the vehicle driver effects during-stoppage steering maneuvering in the counterclockwise direction, except that the motor current and regenerative current are opposite in polarity to the above-mentioned.

However, because the current signal $I_{MO}$ corresponding to the motor current $I_M$ is negatively fed back to the target current signal $I_{MS}$ in the above-discussed conventional electric power steering apparatus, the during-stoppage steering maneuvering (e.g., in the clockwise direction) followed by release of the steering wheel causes regenerative current $I_{D+}$ to be added the motor current $I_{M+}$ so that the summed motor current ($I_{M+}+I_{D+}$) exceeds the target current $I_{MS}$. Thus, when the polarity of the motor control signal $V_O$, is inverted, the motor current would abruptly change to a negative-polarity motor current $I_{M-}$. Such an abrupt change in the motor current polarity would undesirably cause abnormal sounds due to vibration of the motor and considerable deterioration in the steering feeling due to a change in steering characteristics.

SUMMARY OF THE INVENTION

To provide solutions to the above-mentioned problems, an electric power steering apparatus in accordance with the present invention comprises a steering torque sensor for detecting steering torque caused by a steering system of the vehicle, an electric motor for generating and applying a steering assist to the steering system, and a control unit which includes a motor current detecting section for detecting a current flowing in the motor so as to generate a motor current signal, a target current setting section for generating a target current signal corresponding at least to a steering torque signal output from the steering torque sensor, an offset determining section for determining an offset between the target current signal and the motor current signal generated by the motor current detecting section so as to generate an offset signal indicative of the determined offset and a drive control section for, on the basis of the offset signal generated by the offset determining section, generating a motor control signal that is a combination of a pulse-width-modulated signal and an ON signal. The apparatus further comprises a motor drive unit including a bridge circuit comprised of a plurality of switching elements, and the switching elements forming each opposite side of the bridge circuit are simultaneously controlled on the basis of the motor control signal generated by the drive control section so as to generate a drive signal for causing the motor to rotate in either of forward and reverse directions. The control unit further includes a regenerative current control unit including a regenerating condition determining section for determining whether or not the motor is in a regenerating condition, a regeneration control signal generating section for generating a regeneration control signal to control the regenerating condition of the motor and a switching section for selecting between the motor control signal and the regeneration control signal in accordance with a determination result of the regenerating condition determining section. With this arrangement, a motor current including a regenerative current that is caused to flow in the motor by a vehicle driver effecting during-stoppage steering maneuvering and then releasing the steering wheel can be controlled independently of a feedback loop of the apparatus. Thus, it is possible to prevent abnormal sounds that would otherwise occur due to vibration of the motor in the regenerative condition and to thereby provide an improved steering feeling.

Preferably, the regeneration control signal generating section generates a PWM signal having a duty cycle corresponding to an offset between a target current signal and a motor current signal. This arrangement makes it possible to optionally control the motor current including a regenerative current that is caused to flow in the motor by the vehicle driver effecting during-stoppage steering maneuvering and then releasing the steering wheel. As a result, the motor current is allowed to vary gently when the motor shifts to the regenerative condition and the steering wheel is also allowed to return toward an original position, which even more greatly improves the steering feeling.

BRIEF DESCRIPTION OF THE DRAWINGS

The above and other objects and advantages of the present invention will become apparent from the following detailed description of the preferred embodiments when read in conjunction with the accompanying drawings, in which.

DETAILED DESCRIPTION OF THE PREFERRED EMBODIMENTS

Figure 1:
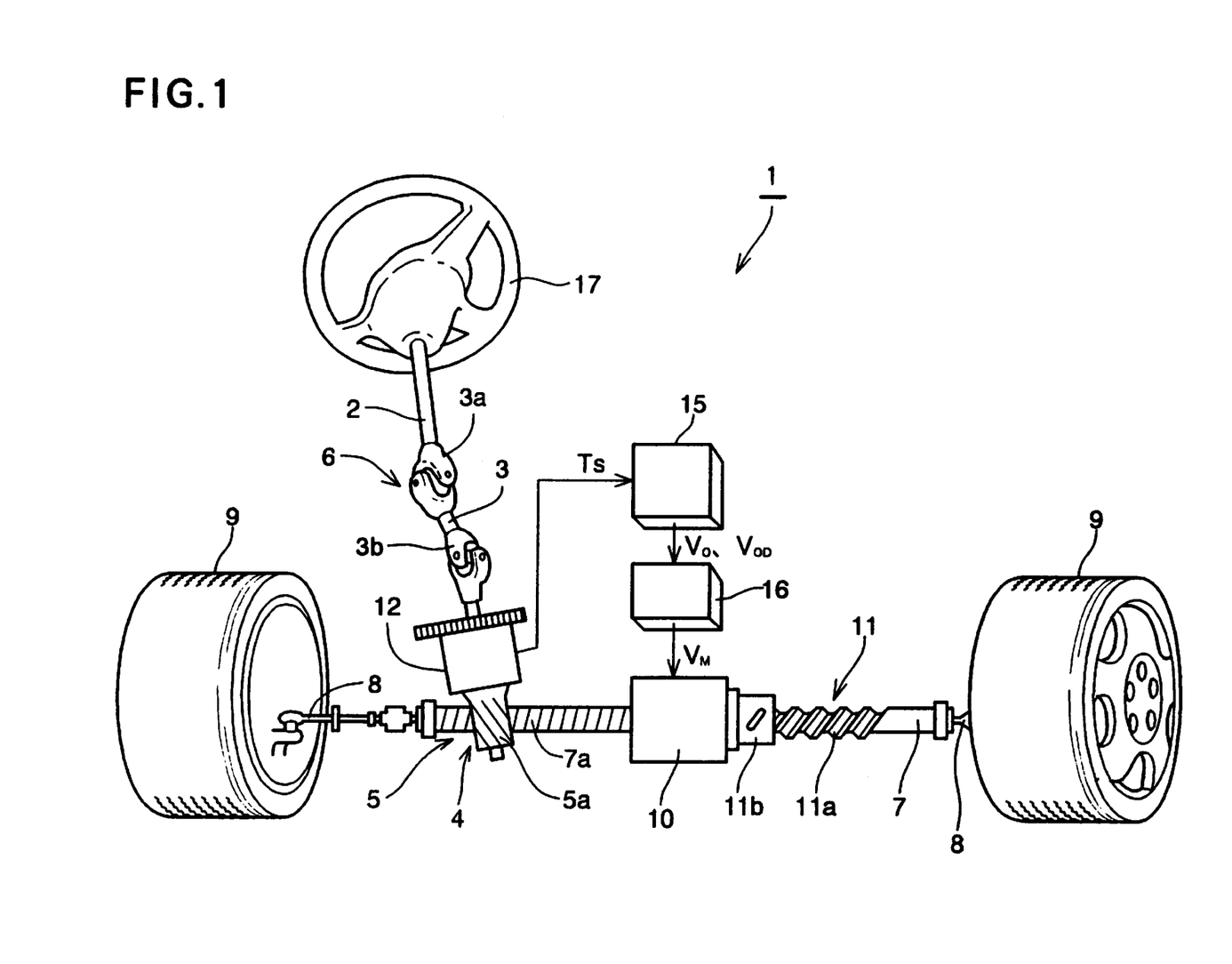
FIG. 1 is a diagram showing the general structure of an electric power steering apparatus according to one embodiment of the present invention.

FIG. 1 is a block diagram showing the general structure of an electric power steering apparatus according to one embodiment of the present invention, which is designed to control the switching action of FET's of a motor-driving bridge circuit so as to optionally control a regenerative current resulting from counterelectromotive force of an electric motor.

In FIG. 1, the electric power steering apparatus 1 comprises a manual steering power generation unit 6, which includes a steering shaft 2 that is integrally connected at one end to a steering wheel 17 and connected at the other end to a pinion 5A of a rack and pinion set 5 via a connecting shaft 3 having universal joints 3A and 3B mounted on opposite end thereof. The pinion 5A is in meshing engagement with a toothed rack 7A, and a rack shaft 7 reciprocatively movable through the meshing engagement between the pinion 5A and rack 7A is connected at opposite ends to left and right steerable front wheels 9 via tie rods 8. Thus, in response to the driver's steering operation of the wheel 17, the front wheels 9 are driven to vary the running direction of the vehicle through the rack-and-pinion-based manual steering power generation unit 6.

In order to reduce the amount of steering power that has to be produced by the manual steering power generation unit 6, an electric motor 10 for supplying a steering assist is connected coaxially with the rack shaft 7, and the supplied steering assist is converted, via a ball thread mechanism 11 provided coaxially with the rack shaft 7, into thrust that is applied to the rack shaft 7 (ball thread shaft 11A).

Steering torque sensor 12 is contained in a steering gear box 4 and detects a direction and intensity of manual steering power applied by the vehicle driver. A steering torque signal $T_S$ indicative of the steering torque detected via the sensor 12 is supplied to a control unit 15 which will be later described in detail.

Figure 4:
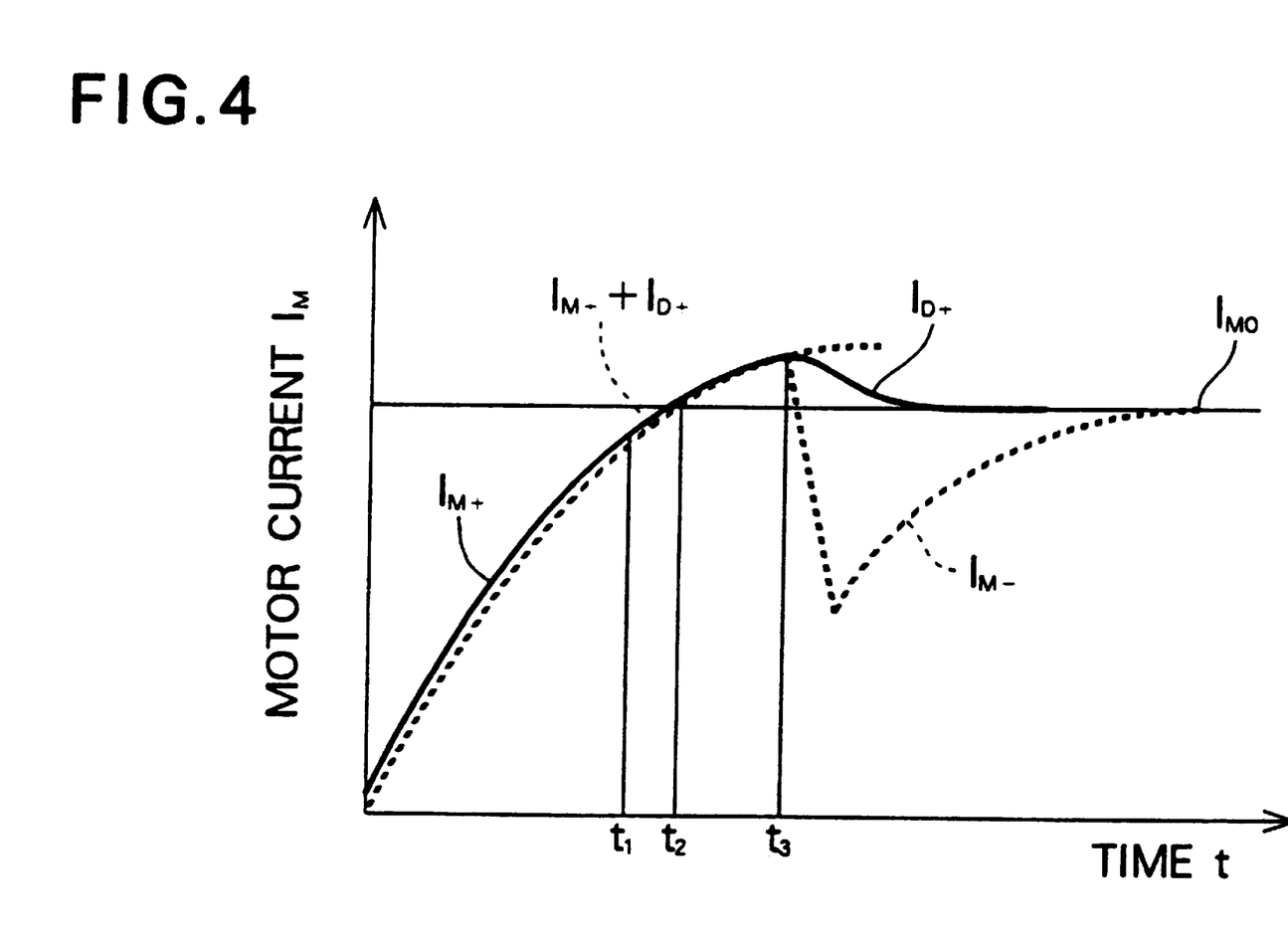
FIG. 4 is a graph showing time-varying characteristics of a motor current achieved, in the steering apparatus of the present invention, when a vehicle driver effects during-stoppage steering operation and then releases a steering wheel of the vehicle.

The control unit 15, essentially comprising a microprocessor and memory, generates a motor control signal $V_O$ (a combination of an ON signal and PWM signal, for example) to controllably drive a motor drive unit 16. The control unit 15 operates to change the ON signal to the OFF signal and generate a regeneration control signal $V_{OD}$ by changing the PWM signal to have a predetermined duty cycle corresponding to (e.g., inversely proportional to) an offset signal ΔI. Thus, the control unit 15 PWM-controls only one of four switching elements of the bridge circuit constituting the motor drive unit 16 and turns off the other switching elements, to thereby optionally control a regenerative current. The motor drive unit 16, comprising the bridge circuit of, for example, four switching FET's (Field-Effect Transistors) as shown in FIG. 4, generates a motor voltage $V_M$ for driving the electric motor 10 on the basis of the motor control signal $V_O$, and regeneration control signal $V_{OD}$.

Figure 2:
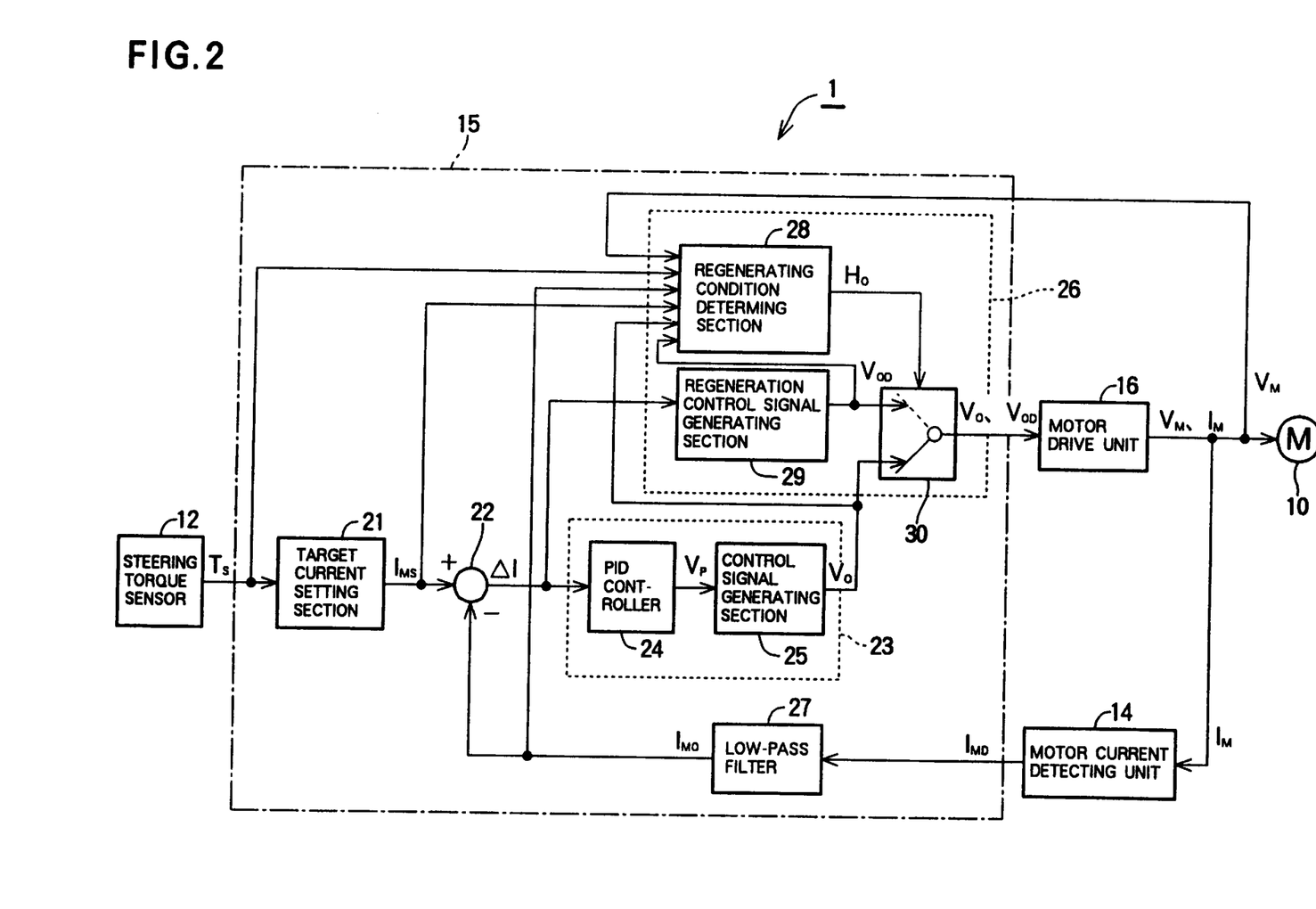
FIG. 2 is a block diagram showing principal components of the electric power steering apparatus of FIG. 1.

FIG. 2 is a block diagram showing principal components of the electric power steering apparatus of FIG. 1, which include the steering torque sensor 12, control unit 15, motor drive unit 16, motor current detecting unit 14 and electric motor 10. The steering torque sensor 12, which may be implemented by a differential transformer, generates a steering torque signal $T_S$ indicative of a direction (positive or negative polarity) and level of steering torque and supplies the generated steering torque signal $T_S$ to the control unit 15.

As shown, the control unit 15 comprises a target current setting section 21, an offset determining section 22, a drive control section 23, a regenerative current control section 26 and a low-pass filter 27.

The target current setting section 21, including a memory such as a ROM, converts the analog steering torque signal $T_S$ from the torque sensor 12 into digital form via an A/D converter (not shown), and reads out, from a torque-signal vs. target-current-signal table prestored in the memory, one of values of target current signal $I_{MS}$ corresponding to the value of the detected steering torque signal $T_S$. The read-out target current signal value $I_{MS}$ is passed to the offset determining section 22.

The offset determining section 22, which may be implemented by a subtracter or software-controlled subtracting function, calculates an offset between the target current signal value $I_{MS}$ and a current signal $I_{MO}$ obtained by attenuating high-frequency components (such as noise) of a motor current detection signal $I_{MD}$ via the low-pass filter 27, and supplies a signal indicative of the calculated offset ($I_{MS-IMO}$) to the drive control unit 23 as an offset signal ΔI.

PID controller 24 applies software-controlled PID (proportional and integral and derivative) arithmetic processing to the offset signal ΔI supplied from the offset determining section 22, in order to improve the gain, stability and rise characteristic of the signal ΔI and supply a control signal generating section 25 with a PID control signal $V_P$ that is controlled to allow the offset signal ΔI to be stabilized and promptly become null.

The control signal generating section 25, on the basis of the PID control signal $V_P$, generates motor control signal $V_O$, a combination of ON signal $V_{ON}$ and PWM signal $V_{PWM}$, and supplies the motor control signal $V_O$, to the regenerative current control section 26.

The regenerative current control section 26 includes a regenerating condition determining section 28, a regeneration control signal generating section 29 and a switching section 30. On the basis of the target current signal $I_{MS}$, offset signal ΔI, steering torque signal $T_S$, current signal $I_{MO}$, motor control signal $V_O$ and motor voltage $V_M$, the regenerative current control section 26 passes the motor control signal $V_O$ from the drive control section 23 to the motor drive unit 16 when the motor is in a normal steering condition, but, in the regenerating condition, supplies the motor drive unit 16 with regeneration control signal $V_{OD}$ in place of the motor control signal $V_O$ from the drive control section 23.

The regenerating condition determining section 28, which has arithmetic and logical operation functions, examines whether the sign E of the target current signal $I_{MS}$ is in conformity with the sign F of the motor drive unit 16 (E=F) or whether the direction G of the steering torque signal $T_S$ is in conformity with the rotational direction H of the electric motor 10 calculated from the current signal $I_{MO}$ and motor voltage $V_M$ (G=H). With an affirmative examination result, the regenerating condition determining section 28 determines that the motor is in the normal steering condition and thus supplies a determination signal $H_O$ (e.g., of low level) to the switching section 30 for switching control corresponding to the condition.

With a negative examination result, i.e., if the sign E of the target current signal $I_{MS}$ is not in conformity with the sign F of the motor drive unit 16 (E≠F) and the direction G of the steering torque signal $T_S$ is not in conformity with the rotational direction H of the electric motor 10 calculated from the current signal $I_{MO}$ and motor voltage $V_M$ (G≠H), the regenerating condition determining section 28 determines that the motor is in the regenerating condition and thus supplies a determination signal $H_O$ (e.g., of high level) to the switching section 30 for switching control corresponding to the condition.

In the present embodiment, the rotational direction H of the electric motor 10 is determined from the sign of a specific number of motor rotations $N_M$ which may be calculated in accordance with the following equation using the current signal $I_{MO}$, motor voltage $V_M$, motor resistance $R_M$ and inductive voltage coefficient $K_M$:

$$N_M = (V_M - I_{MO} * R_M)/K_M \qquad \text{Equation (1)}$$

For example, according to the embodiment, the sign E of the target current signal $I_{MS}$ is set to be positive (+) if the steering torque signal $T_S$ generated in response to the driver's clockwise steering operation is of positive (+) polarity, the sign F of the motor control signal $V_O$ is set to be positive (+) if it is such a signal to allow the motor 10 to urge the steering wheel in the clockwise direction, and the rotational direction H is set to be positive (+) if the rotation of the motor 10 corresponds to the clockwise movement of the steering wheel.

When the regeneration control signal generating section 29 calculates a PWM duty cycle exceeding 100% during the regeneration condition (i.e., while the determination signal $H_O$ is at the high level), the regenerating condition determining section 28 determines that the regeneration control is OFF or not under way, and thus changes the high-level determination signal $H_O$ to the low level so that the low-level determination signal $H_O$ is supplied to the switching section 30.

The regeneration control signal generating section 29 includes a PWM (Pulse Width Modulation) signal generator (not shown), and when it is determined that the motor is in the regenerating condition (the determination signal $H_O$ is at the high level), the section 29 generates regeneration control signal $V_{OD}$ composed of OFF signal $V_{OF}$ and PWM signal $V_{PWMD}$ having a predetermined duty cycle corresponding to (e.g., inversely proportional to) the offset signal $\Delta I$ and supplies the thus-generated signal $V_{OD}$ to the switching section 30.

The switching section 30, which has a software-controlled switching function, selects the regeneration control signal $V_{OD}$ from the regeneration control signal generating section 29 when the determination signal $H_O$ from the regenerating condition determining section 28 is for example at the high level, but selects the motor control signal $V_O$ from the control signal generating section 25 when the determination signal $H_O$ is at the low level. The selected regeneration control signal $V_{OD}$ or motor control signal $V_O$ is supplied to the motor drive unit 16.

Because the control unit 15 of the electric power steering apparatus 1 according to the present invention is provided with the regenerative current control section 26 which includes the regenerating condition determining section 28 for determining whether or not the motor 10 is in the regenerating condition, the regeneration control signal generating section 29 and the switching section 30 for selecting between the motor control signal $V_O$ and the regeneration control signal $V_{OD}$ in accordance with the determination signal $H_O$ output from the regenerating condition determining section 28, the motor current including a regenerative current, caused to flow in the motor by the vehicle driver effecting during-stoppage steering maneuvering and then releasing the steering wheel, can be controlled independently of the feedback loop.

Figure 3:
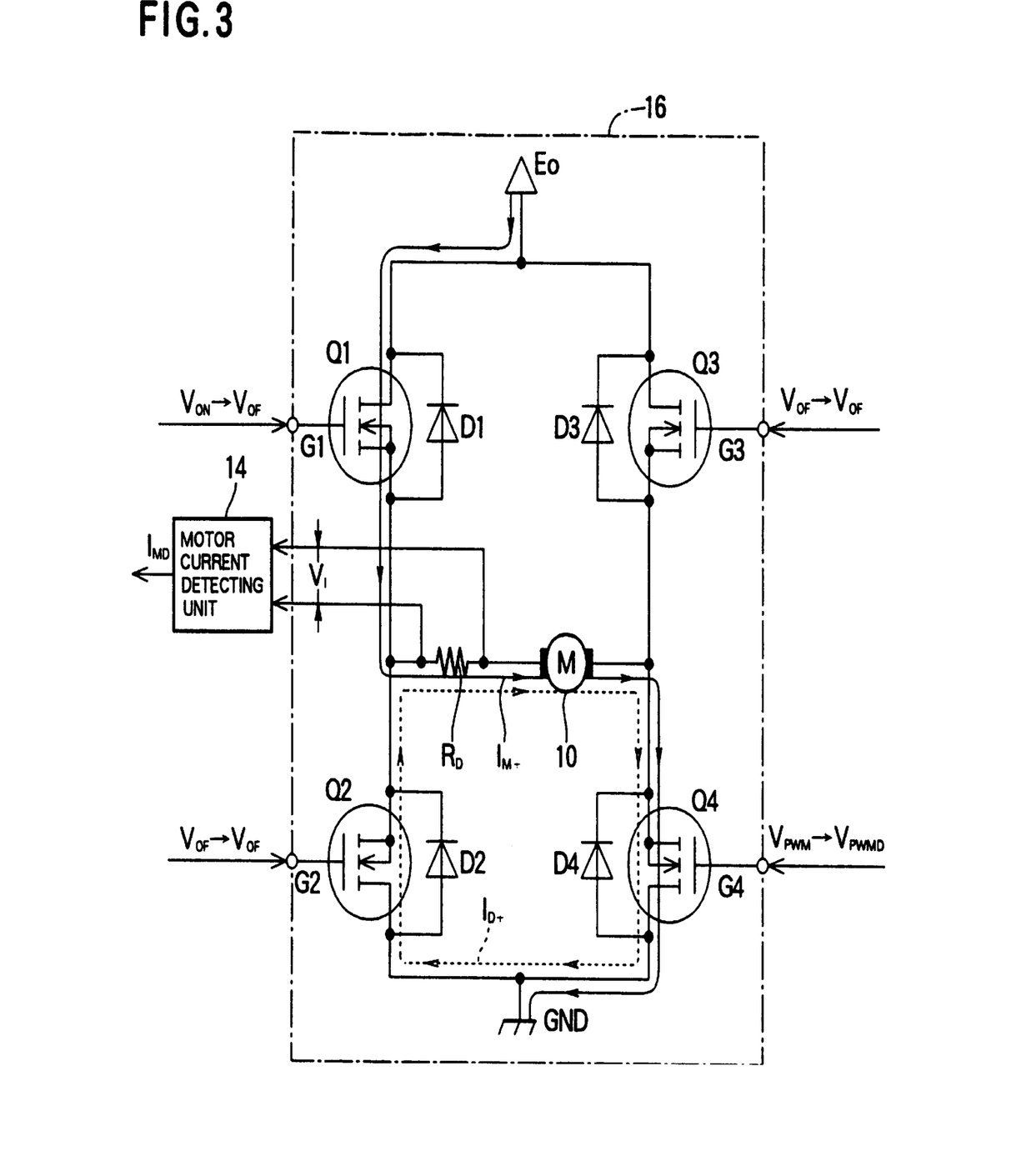
FIG. 3 is a diagram explanatory of an exemplary operation of regenerative current control according to the present invention.

FIG. 3 is a diagram explanatory of an exemplary operation of regenerative current control according to the present invention. The following description is made in relation to a case where the driver operates the steering wheel in the clockwise direction during stoppage of the vehicle and then releases the steering wheel. In FIG. 3, the motor drive unit 16 includes four power FET's Q1 to Q4 forming the bridge circuit and having equivalent diodes connected between their respective sources and drains. The transistors Q1 and Q3 are connected to a D.C. power supply $E_O$, while the transistors Q2 and Q4 are connected to the vehicle body ground GND.

Between the contacts of the transistors Q1 and Q2 and of the transistors Q3 and Q4, there are connected in series a motor current detecting resistor $R_D$ and the electric motor 10. Motor voltage $V_M$ (having a peak value corresponding to the D.C. power supply $E_O$) and motor current $I_M$ ($I_{M+}+I_{M-}$) are supplied to the motor 10 by controlling the respective gates G1 to G4 of the transistors Q1 to Q4 with the composite motor control signal $V_O$ ($V_{ON}$, $V_{PWM}$, $V_{OF}$) sent from the drive control section 23 of FIG. 2.

When the vehicle driver effects during-stoppage steering maneuvering in the clockwise direction, the control signal generating section 25 of the drive control section 23 shown in FIG. 2 supplies motor control signal $V_O$ ($V_{ON}$, $V_{PWM}$, $V_{OF}$) to the motor drive unit 16, so that the gate G1 is driven by the ON signal $V_{ON}$, the gates G2 and G3 are driven by the OFF signal $V_{OF}$ and the gate G4 is driven by the PWM signal $V_{PWM}$ corresponding to a predetermined level of positive-polarity target current signal $I_{MS}$. Thus, the motor current $I_{M+}$ is flown from the D.C. power supply $E_O$, through the transistor Q1, resistor $R_D$, electric motor 10, transistor Q4, to the ground GND as denoted by solid-line arrows, so that the motor 10 is caused to rotate in the forward direction to apply a clockwise steering assist to the steering system, which in turn operates to orient the vehicle wheels in the right direction.

If the driver then releases the steering wheel, the motor 10 is caused to rotate via springy components of the steering system such as rubber tires, and counterelectromotive force $V_{MR}$ produced by the motor 10 would cause a "regenerative current" $I_{D+}$ to flow through the closed loop from the motor 10, through the diode D3, transistor Q1 and resistor $R_D$, back to the motor 10 in a similar manner to the example of FIG. 7. In this case, a sum of the motor current $I_{M+}$ and regenerative current $I_{D+}$ ($I_{M+}+I_{D+}$) is detected via the motor current detecting resistor $R_D$, and the sum ($I_{M+}+I_{D+}$) is supplied, as current signal IMO, to the offset determining section 22 via the low-pass filter 27, which in turn calculates an offset value $\Delta I$ from the target current signal $I_{MS}$ (=$I_{MS}$−$I_{MO}$).

When the current signal $I_{MO}$ increases in value to cause the sign F of the motor control signal $V_O$ to become negative (−) while the sign E of the target current signal $I_{MS}$ is positive (+), and if the sign G of the steering torque signal $T_S$ (which is the same as the sign of the target current signal $I_{MS}$) is not in conformity with the sign H of the number of the motor rotations $N_M$ Equation (1) above (G≠H), regeneration control signal $V_{OD}$ is supplied from the regenerative current control section 26 of FIG. 2. Thus, the gates G1 to G3 of the transistors Q1 to Q3 are controlled by the OFF signal $V_{OF}$ and the gate G4 of the transistor Q4 is controlled by the PWM signal $V_{PWMD}$ having a predetermined duty cycle corresponding to the offset signal $\Delta I$.

Once the regeneration control signal $V_{OD}$ is supplied, the flow of the motor current $I_{M+}$ is broken, and consequently the regenerative current $I_{D+}$ will attenuate with passage of time while flowing through the closed loop from the motor 10, through the diode D3, transistor Q1 and resistor $R_D$, back to the motor 10.

When, on the other hand, the regenerating condition occurs due to the driver's during-stoppage steering maneuvering in the counterclockwise direction, the field-effect transistors Q1, Q2 and Q3 are turned off and the other field-effect transistor Q2 is driven by the PWM signal $V_{PWMD}$ having the predetermined duty cycle.

In the above-mentioned manner, the bridge circuit comprised of the filed-effect transistors is controllably driven by the regeneration control signal $V_{OD}$ that contains the PWM signal $V_{PWMD}$ having a predetermined duty cycle corresponding to (e.g., inversely proportional to) the offset signal $\Delta I$, and the regenerative current $I_{D+}$ or $I_{D-}$ can be set to flow in the same direction as the motor current $I_{M+}$ or $I_{M-}$ which flows in the direction of the driver's during-stoppage steering maneuvering. This prevents abrupt polarity inversion of the motor current $I_{M+}$ or $I_{M-}$ and allows the steering wheel to return slowly toward the original position.

FIG. 4 is a diagram showing time-varying characteristics of the motor current achieved, in the steering apparatus of the present invention, when the driver effects during-stoppage steering operation and then releases the steering wheel at time $t_3$. As seen from the motor current characteristics of FIG. 4, the motor current $I_M$ after time $t_3$ when a regenerating condition begins is controlled in such a manner that generation of motor current $I_{M-}$ having an abruptly inverted polarity is prevented to thereby allow only regenerative current $I_{D+}$ to change slowly as denoted in solid line.

By means of the resistor $R_D$ connected in series with the motor 10 as shown in FIG. 3, the motor current detecting unit 14 of FIG. 2 detects the motor current $I_M$ (in the embodiment, $I_{M+}$ corresponding to the forward rotation of the motor 10, and $I_{M-}$ corresponding to the reverse rotation) as voltage $V_I$. The motor current detecting unit 14 converts the detected voltage $V_I$ into motor current detection signal $I_{MD}$, which is sent to the low-pass filter 27 of the control unit 15.

Figure 5:
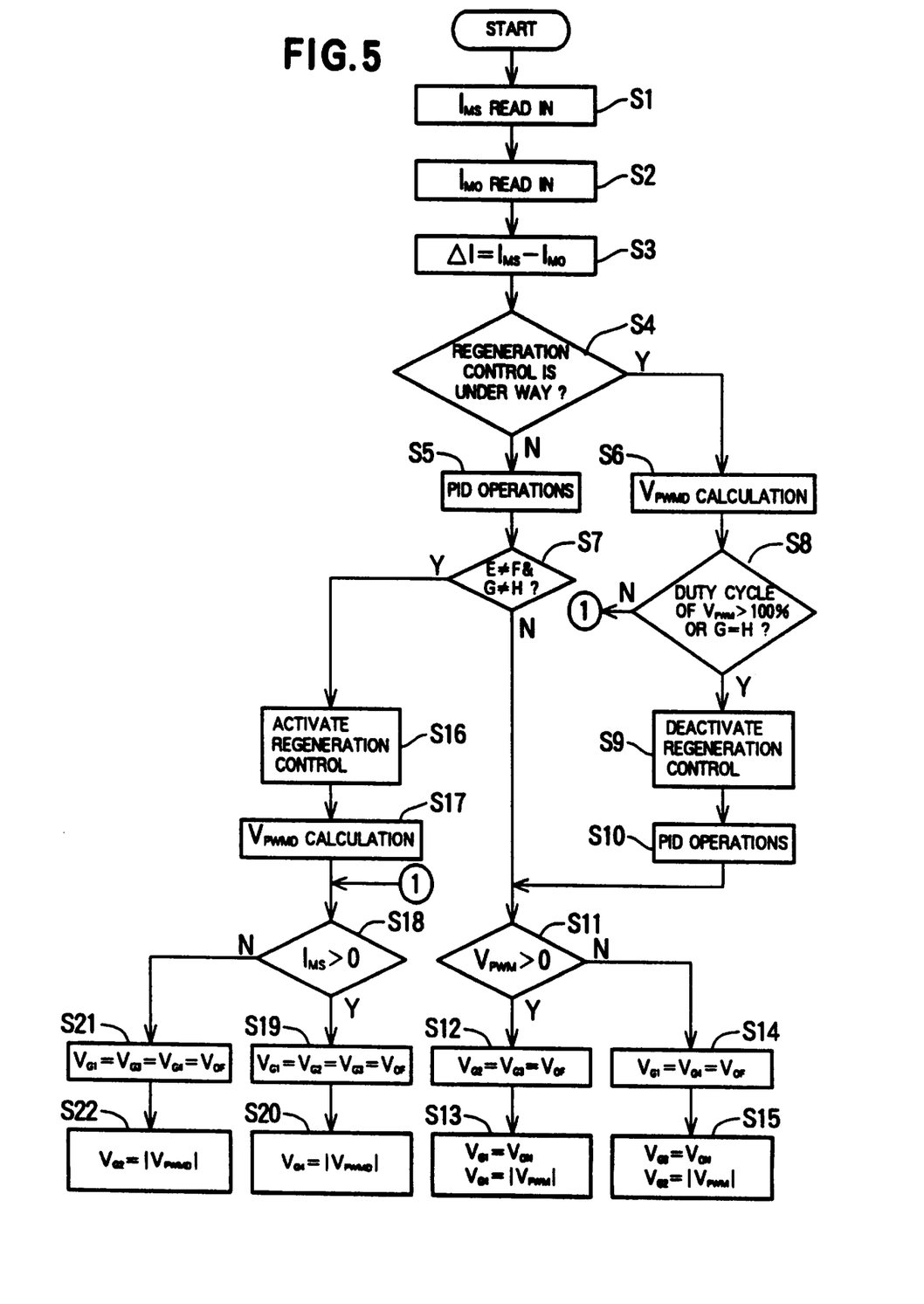
FIG. 5 is a flowchart showing an exemplary control flow of the electric power steering apparatus according to the embodiment of the present invention.

FIG. 5 is a flowchart showing an exemplary control flow of the electric power steering apparatus according to the present invention.

Target current $I_{MS}$ generated by the setting section 21 and corresponding to steering torque signal $T_S$ is read in at step S1, and current signal $I_{MO}$ based on detected motor current $I_M$ are read in at step S2. Then, at step S3, an offset $\Delta I$ between the thus read-in target current signal $I_{MS}$ and current signal $I_{MO}$ ($I_{MS-IMO}$). At next step S4, a determination is made as to whether the control unit 15 is currently performing the regeneration control. With a negative determination, the control proceeds to step S5 to effect the PID (proportional and integral and derivative) operations. If, on the other hand, the control unit 15 is currently performing the regeneration control, the control branches to step S6 to calculate PWM signal $V_{PWMD}$ for regeneration control.

After step S6, a determination is made at step S8 as to whether the calculated duty cycle of the PWM signal $V_{PWMD}$ exceeds 100% ($V_{PWMD}$>100%) or the direction G of the steering torque $T_S$ is in conformity with the rotational direction H of the motor 10 (G=H). With an affirmative determination at step S8, the control proceeds to step S9 to deactivate the regeneration control, and goes to step S11 after PID operations are performed at step S10. If the calculated duty cycle of the PWM signal $V_{PWMD}$ is not more than 100% or if the direction G of the steering torque $T_S$ is not in conformity with the rotational direction H of the motor 10 (G≠H), the control goes to step S18.

Following the PID operations of step S5, a determination is made at step S7 as to whether the sign E of the target current signal $I_{MS}$ is not in conformity with the sign F of the motor control signal $V_O$ (E≠F) and the direction G of the steering torque $T_S$ is opposite to the rotational direction H of the motor 10 (G≠H). In answered in the affirmative at step S7, it is determined that the motor 10 is in the regenerating condition, so that the control moves to step S16 to activate (set ON) the regeneration control in the control unit 15. If, on the other hand, the sign E of the target current signal $I_{MS}$ is in conformity with the sign F of the motor control signal $V_O$ (E=F) or if the direction G of the steering torque $T_S$ is the same as the rotational direction H of the motor 10 (G=H), it is determined that the motor 10 is in the normal steering condition, and the control proceeds to step S11.

At step S11, a determination is made about the polarity of the PWM signal $V_{PWM}$ in the normal steering condition. If the PWM signal $V_{PWM}$ is of positive polarity ($V_{PWM}$>0), the control proceeds to steps S12 and S13, where, of the composite motor control signal $V_O$ (combination of signals $V_{OF}$, $V_{ON}$ and $V_{PWM}$) for causing the motor 10 to rotate in the forward direction, the OFF signal $V_{OF}$ is fed to the gates G2 and G3 to turn off the transistors Q2 and Q3 of the motor drive unit 16, the ON signal $V_{ON}$ is fed to the gate G1 to turn on the transistor Q1, and the PWM signal $V_{PWM}$ is fed to the gate G4 to PWM-control the transistor Q4.

If, on the other hand, the PWM signal $V_{PWM}$ is of negative polarity ($V_{PWM}$<0) as determined at step S11, the control proceeds to steps S14 and S15, where, of the composite motor control signal $V_O$ (combination of signals $V_{OF}$, $V_{ON}$ and $V_{PWM}$) for causing the motor 10 to rotate in the reverse direction, the OFF signal $V_{OF}$ is fed to the gates G1 and G4 to turn off the transistors Q1 and Q4 of the motor drive unit 16, the ON signal $V_{ON}$ is fed to the gate G3 to turn on the transistor Q3, and the PWM signal $V_{PWM}$ is fed to the gate G2 to PWM-control the transistor Q2.

After the regeneration control is activated in the control unit 15 at step S16, the control proceeds to step S18 after calculating regeneration controlling PWM signal $V_{PWMD}$ at step S17. At step S18, the polarity of the target current signal $I_{MS}$ after steps S17 and S8 is determined. If the target current signal $I_{MS}$ is of positive polarity ($I_{MS}>0$), the control proceeds to steps S19 and S20, where, of regeneration control signal $V_{OD}$ signal (combination of signals $V_{OF}$, $V_{PWMD}$), the OFF signal $V_{OF}$ is fed to the gates G1 to G3 to turn off the transistors Q1 to Q3 of the motor drive unit 16 and the PWM signal $V_{PWM}$ is fed to the gate G4 to PWM-control the transistor Q4, so as to effect regeneration control of the motor 10 rotating in the reverse direction (motor current $I_{M-}$).

As has been described so far, the electric power steering apparatus is characterized in that the control unit is provided with the regenerative current control section which includes the regenerating condition determining section for determining whether or not the motor is in a regenerating condition, the regeneration control signal generating section for generating a regeneration control signal, and the switching section for selecting between the motor control signal and the regeneration control signal on the basis of a result of determination by the regenerative condition determining section. With this arrangement, a motor current including a regenerative current that is caused to flow in the motor by the vehicle driver effecting during-stoppage steering maneuvering and then releasing the steering wheel can be controlled independently of the feedback loop. Thus, it is possible to prevent occurrence of abnormal sounds due to vibration of the motor in the regenerative condition and to provide an improved steering feeling.

Further, because the regeneration control signal generating section generates a PWM signal having a duty cycle corresponding to an offset between a target current signal and a motor current signal, it is allowed to optionally control the motor current including a regenerative current that is caused to flow in the motor by the vehicle driver effecting during-stoppage steering maneuvering and then releasing the steering wheel. As a result, the motor current can vary gently when the motor shifts to the regenerative condition and the steering wheel is allowed to return toward the original position, which even more greatly improves the steering feeling.

Furthermore, because of the provision of the regenerative condition determining section in the control unit which determines that the motor is in the regenerative condition when the signs of the target current signal and motor current control signal do not comport with each other and also the direction of the steering torque signal and the rotational direction of the motor are opposite to each other, the regenerative condition can be detected reliably and the motor current is allowed to vary gently when the motor shifts to the regenerative condition.

What is claimed is:

1. An electric power steering apparatus for use with an automotive vehicle, comprising:

a steering torque sensor for detecting steering torque caused by a steering system of the vehicle;

an electric motor for generating and applying a steering assist to the steering system;

a control unit including a motor current detecting section for detecting a current flowing in said motor so as to generate a motor current signal, a target current setting section for generating a target current signal corresponding at least to a steering torque signal output from said steering torque sensor, an offset determining section for determining an offset between the target current signal and the motor current signal generated by said motor current detecting section so as to generate an offset signal indicative of the determined offset, and a drive control section for, on the basis of the offset signal generated by said offset determining section, generating a motor control signal that is a combination of a pulse-width-modulated signal and an ON signal;

a motor drive unit including a bridge circuit comprised of a plurality of switching elements, said switching elements forming each opposite side of said bridge circuit being simultaneously controlled on the basis of the motor control signal generated by said drive control section so as to generate a drive signal for causing said motor to rotate in either of forward and reverse directions; and a regenerative current control unit including a regenerating condition determining section for determining whether or not said motor is in a regenerating condition, a regeneration control signal generating section for generating a regeneration control signal to control the regenerating condition of said motor and a switching section for selecting between the motor control signal and the regeneration control signal in accordance with a determination result of said regenerating condition determining section;

wherein said regenerating condition determining section determines that said motor is in the regenerating condition if both a) the signs of the target current signal and motor current control signal are different and b) a direction of the steering torque signal does not comport with the rotational direction of the motor.

2. An electric power steering apparatus as defined in claim 1 wherein said regeneration control signal generating section generates a pulse-width-modulated signal having a duty cycle that varies inversely relative to the offset signal generated by said offset determining section.

3. An electric power steering apparatus as defined in claim 1, wherein the regenerative current control unit is deactivated when the duty cycle of the pulse-width-modulated signal exceeds 100% or the direction of the steering torque signal corresponds to the rotational direction of the motor.

* * * * *